US009836171B2

(12) United States Patent
Watazu

(10) Patent No.: US 9,836,171 B2
(45) Date of Patent: Dec. 5, 2017

(54) PRESSURE DETECTION AND DISPLAY APPARATUS AND ELECTRONIC DEVICE

(71) Applicant: NISSHA PRINTING CO., LTD., Kyoto-shi, Kyoto (JP)

(72) Inventor: Yuji Watazu, Kyoto (JP)

(73) Assignee: Nissha Co., Ltd., Kyoto (JP)

( * ) Notice: Subject to any disclaimer, the term of this patent is extended or adjusted under 35 U.S.C. 154(b) by 0 days.

(21) Appl. No.: 14/895,888

(22) PCT Filed: May 21, 2014

(86) PCT No.: PCT/JP2014/063508
§ 371 (c)(1),
(2) Date: Dec. 3, 2015

(87) PCT Pub. No.: WO2014/196365
PCT Pub. Date: Dec. 11, 2014

(65) Prior Publication Data
US 2016/0132151 A1 May 12, 2016

(30) Foreign Application Priority Data

Jun. 4, 2013 (JP) ................................. 2013-118300

(51) Int. Cl.
*G06F 3/044* (2006.01)
*G01L 1/16* (2006.01)
(Continued)

(52) U.S. Cl.
CPC ............... *G06F 3/044* (2013.01); *G01L 1/16* (2013.01); *G01L 9/08* (2013.01); *G06F 3/0412* (2013.01);
(Continued)

(58) Field of Classification Search
CPC ... G01L 1/16; G01L 9/08; G06F 3/044; G06F 2203/04105; G02F 2001/133394
See application file for complete search history.

(56) References Cited

U.S. PATENT DOCUMENTS 6,124,919 A * 9/2000 Kubo ................ G02F 1/133555
349/113
2009/0072670 A1* 3/2009 Hansson .................. G01D 5/18
310/338
(Continued)

FOREIGN PATENT DOCUMENTS

JP 2004-125571 A 4/2004
JP 2010-108490 A 5/2010
(Continued)

OTHER PUBLICATIONS

International Search Report in PCT/JP2014/063508 dated Aug. 19, 2014.

*Primary Examiner* — Michael Faragalla
*Assistant Examiner* — Chayce Bibbee
(74) *Attorney, Agent, or Firm* — Global IP Counselors, LLP

(57) ABSTRACT

A pressure detection and display apparatus can provide good visibility even if a person wears polarized sunglasses. The pressure detection and display apparatus includes a piezoelectric sensor having upper electrode, lower electrode, and a piezoelectric layer interposed between the upper electrode and the lower electrode, a polarization plate disposed under the lower electrode, and a display member disposed under the polarization plate. The piezoelectric layer is made of a retardation plate. The piezoelectric sensor and the polarization plate are arranged such that the absorption axis of the piezoelectric layer defines an angle of 20 degrees to 70 degrees relative to the slow phase axis of the polarization plate.

14 Claims, 2 Drawing Sheets

(51) Int. Cl.
*G06F 3/041* (2006.01)
*G01L 9/08* (2006.01)
*G02F 1/1333* (2006.01)

(52) U.S. Cl.
CPC ........ *G06F 3/0414* (2013.01); *G02F 1/13338* (2013.01); *G02F 2001/133394* (2013.01); *G06F 2203/04103* (2013.01); *G06F 2203/04105* (2013.01)

(56) References Cited

U.S. PATENT DOCUMENTS

| | | | |
|---|---|---|---|
| 2010/0157204 A1* | 6/2010 | Ichihashi | C09K 19/3491 349/75 |
| 2011/0224342 A1 | 9/2011 | Masuda et al. | |
| 2013/0021544 A1* | 1/2013 | Fukuyama | G02F 1/13338 349/12 |
| 2014/0152618 A1 | 6/2014 | Ando | |

FOREIGN PATENT DOCUMENTS

| | | |
|---|---|---|
| JP | 2010-181561 A | 8/2010 |
| WO | 2013/021835 A1 | 2/2013 |

* cited by examiner

PRESSURE DETECTION AND DISPLAY APPARATUS AND ELECTRONIC DEVICE

CROSS-REFERENCE TO RELATED APPLICATIONS

This U.S. National stage application claims priority under 35 U.S.C. §119(a) to Japanese Patent Application No. 2013-118300, filed in Japan on Jun. 4, 2013, the entire contents of Japanese Patent Application Nos. 2013-118300 are hereby incorporated herein by reference.

BACKGROUND

Field of the Invention

The present invention is related to pressure detection and display apparatuses and electronic devices.

Background Information

Piezoelectric sensors have been known which utilize a piezoelectric layer to detect the applied load. For example, in Japanese Patent Publication 2004-125571, a transparent piezoelectric sensor including a transparent pressure sensitive layer and a pair of transparent conductive layers is disclosed. Recently, it has been attempted to manufacture pressure detection and display apparatuses by combining a transparent piezoelectric sensor and a display device (mainly, a liquid crystal panel or an organic EL panel).

SUMMARY

However, in the pressure detection and display apparatuses, when operating the piezoelectric sensor, if a person wears polarized sunglasses, the direction of the absorption axis of the light waves of the polarized sunglasses may be the same as that of the light emitted from the polarization plate laminated on the upper surface of the display device so that the person cannot visually recognize the display of pressure detection and display apparatus.

Solution

In order to achieve the object, the present invention is configured as below.

The pressure detection and display apparatus according to the present invention includes a piezoelectric sensor and a display device. The piezoelectric sensor has an upper electrode, a lower electrode, and a piezoelectric layer interposed between the upper electrode and the lower electrode. The display device includes a polarization plate and a display member. In the display device, the polarization plate is laminated on the display member close to the piezoelectric sensor. The piezoelectric layer is made of a retardation plate, and the piezoelectric sensor and the polarization plate are arranged such that a slow phase axis of the phase difference or retardation plate defines an angle of 20 degrees to 70 degrees relative to an absorption axis of the polarization plate.

Accordingly, the light emitted from the display device is converted from linear polarization to elliptic polarization. As a result, even if a person wears polarized sunglasses having the absorption axis of the light waves whose direction is the same as that of the lighting light of the display member, it is possible to visually recognize the display of the display member disposed below the piezoelectric sensor.

The retardation value of the retardation plate may be a quarter of visible light wavelength.

Accordingly, since lighting light of the display device becomes elliptic polarization and is emitted upward, even if a person wears polarized sunglasses having the absorption axis of the same direction as that of the lighting light, it is possible to visually recognize the display device disposed below the piezoelectric sensor more excellently.

The retardation value of the retardation plate may be 800 nm to 30000 nm.

Accordingly, the light emitted from the display member is converted into a state close to natural light and is emitted from the piezoelectric layer. As a result, even if a person observes the display member wearing the polarized sunglasses, he or she can observe the display member without change in color tones.

The upper electrode may include indium tin oxide or "poly(3, 4-ethylenedioxythiophene)".

Accordingly, as the transparency of the upper electrode becomes higher, it is possible to dispose a piezoelectric sensor on a display device such as liquid crystal and organic EL.

The lower electrode may include indium tin oxide or "poly(3, 4-ethylenedioxythiophene)".

Accordingly, since the transparency of the piezoelectric layer becomes higher, it is possible to dispose a piezoelectric sensor on a display device such as liquid crystal and organic EL.

The piezoelectric layer may include organic piezoelectric material.

Accordingly, as the flexibility of the piezoelectric layer becomes higher, the bending resistance of the piezoelectric sensor is improved. As a result, the piezoelectric sensor can be disposed on R curved surfaces.

The organic piezoelectric material may include polyvinylidene fluoride or polylactic acid.

Accordingly, since the transparency of the piezoelectric layer becomes higher, it is possible to dispose a piezoelectric sensor on a display device such as liquid crystal and organic EL.

The electronic device may include a piezoelectric sensor and a touch panel.

Accordingly, even if the load is barely applied to the piezoelectric sensor, it is possible to detect the position of the load.

The touch panel may be a capacitance type touch panel.

Accordingly, the transparency of the entire pressure detection apparatus is improved.

According to a pressure detection and display apparatus of the present invention, even if a person wears polarized sunglasses, he or she can visually recognize the display member disposed below the piezoelectric sensor favorably.

DESCRIPTION OF EMBODIMENTS

Embodiments according to the present invention will be described below i detail with reference to figures. The dimensions, materials, shapes and relative positions of parts or portions described in the embodiments of the present invention are merely described as examples do not limit the scope of the present invention unless otherwise specified.

1. First Embodiment

(1) Structure of the pressure detection and display apparatus

Figure 1:
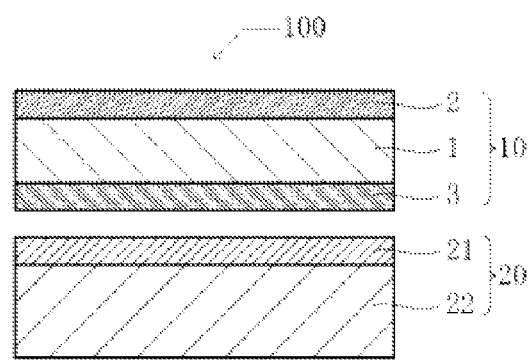
FIG. 1 is a cross section of the pressure detection and display apparatus.

Referring to FIG. 1, the structure of the pressure detection and display apparatus according to an embodiment of the present invention will be described. FIG. 1 is a cross section of the pressure detection and display apparatus.

The pressure detection and display apparatus has a function of detecting amount and position of the applied load.

As shown in FIG. 1, a pressure detection apparatus 100 includes a piezoelectric sensor 10 and a display device 20. The piezoelectric sensor 10 is laminated on the display device 20. The piezoelectric sensor 10 is a device that generates electric charge according to the applied load. The piezoelectric sensor 10 is configured such that a piezoelectric layer 1 is interposed between upper electrode 2 and lower electrode 3. The display device 20 is a device that displays an object on a surface of the piezoelectric sensor 10. The display device 20 is configured such that a polarization plate 21 is laminated on a display member 22.

Hereinbelow, members constituting the piezoelectric sensor 10 will be described.

(2) Piezoelectric Sensor

Again, as shown in FIG. 1, the piezoelectric sensor 10 includes the piezoelectric layer 1, the upper electrode 2, and the lower electrode 3.

(3) Piezoelectric Layer

The piezoelectric layer 1 generates electric charges if the load is applied thereto. Materials of the piezoelectric layer 1 is organic piezoelectric materials, for example. The organic piezoelectric materials may include fluoride compound or its copolymer, and polymer material including chirality. The fluoride compound or its copolymer may be polyvinylidene fluoride, vinylidene fluoride-tetrafluoroethylene copolymer, or vinylidene fluoride-trifluoroethylene copolymer, for example. The polymer material having chirality may be PLAA or PDLA, for example.

Furthermore, the piezoelectric layer 1 has a function as a retardation plate. The organic piezoelectric material is extended to allow the piezoelectric layer 1 to have the function of retardation plate.

(4) Electrodes

The upper electrode 2 and the lower electrode 3 can be flat and patterned. The upper electrode 2 and the lower electrode 3 can be made of conductive materials. The conductive material may include transparent conductive oxide such as Indium-Tin-Oxide (ITO) and Tin-Zinc-Oxide (TZO), or conductive polymer such as Polyethylenedioxythiophene (PEDOT). In this case, the electrodes can be formed with vapor deposition or screen printing, for example.

The conductive material may include conductive metals such as copper and silver. In this case, the electrodes can be formed with vapor deposition, or metal paste such as copper paste and silver paste.

Furthermore, the conductive material may include a binder and conductive materials, such as carbon nanotube, metal grain, and metal nanofiber, disbursed therein.

If the piezoelectric sensor 10 is placed on a display device such as liquid crystal devices and organic EL devices, it is preferable that the piezoelectric layer 1 be made of transparent materials or the piezoelectric sensor is formed so thin that the light can sufficiently transmit therethrough, in order to make it possible to see the display of the display device.

The display device 20 is configured such that the polarization plate 21 is laminated on the display member 22.

The display member 22 is configured such that the liquid crystal element or the organic EL element is interposed by glass substrates. The polarization plate 21 allows only the linear polarization of the specified direction among the light emitted from the display member 22 to transmit therethrough. The polarization plate 21 has a thickness of 150 μm to 200 μm, for example.

According to the above-descried configuration, if the upper surface of the piezoelectric layer 1 is operated with a finger or a pen while the display on the display member 22, which is on the rear surface of the piezoelectric sensor 10, is seen, the piezoelectric layer 1 is deflexed, so that electric charge is generated at the deflected portion of the piezoelectric layer 1.

Then, the electrical charge generated in the piezoelectric layer is detected by an electronic circuit (not shown) via the upper electrode 2 and the lower electrode 3. Based on the amount of the detected electrical charge, various functions of the device are switched.

At this time, the indication of "letters, marks, patterns, and so on" on the display member 22 is, if the polarization plate 21, which is disposed on the upper surface of the display member 22, absorbs light wave in Y direction for example among light waves in X direction and Y direction perpendicular to X direction, the lighting light that has become the linearly polarized light in X direction and which is then emitted from the polarization plate 21. However, this light is converted from the linear polarization to the elliptic polarization light by the piezoelectric layer 1 placed on the polarization plate 21, wherein the piezoelectric layer 1 has a function of the retardation plate and its slow phase axis defines an angle of 20 degrees through 70 degrees relative to the absorption axis of the polarization plate 21. It is further preferable that the angle be 40 degrees through 50 degrees.

As a result, even if a person wears polarized sunglasses having the absorption axis of the light waves whose direction is the same as that of the lighting light of the display member 22, he or she can visually recognize the display of the display member 22 disposed below the piezoelectric sensor 10.

Furthermore, if the retardation value of the piezoelectric layer 1 is 800 nm to 30000 nm, the light emitted from the display member 22 is emitted from the piezoelectric layer 1 without change in color tones.

As a result, the light emitted from the display member 22 is converted into a state close to natural light and then is emitted from the piezoelectric layer 1. As a result, even if a person observes the display member wearing polarized sunglasses, he or she can observe the display member 22 without seeing a change in color tones.

Furthermore, if the retardation value of the piezoelectric layer 1 is a quarter of visible light wavelength, the light emitted from the display member 22 is converted to the light shifted by quarter wavelength by the piezoelectric layer 1, and then is emitted upward. As a result, even if a person wears polarized sunglasses having the absorption axis of the light waves whose direction is the same as that of the lighting light of the display device 22, he or she can visually recognize the display on the display member disposed below the piezoelectric sensor 102 clearly.

According to the present embodiment, the piezoelectric layer 1 of the piezoelectric sensor 10 has a function of the retardation plate, and the piezoelectric layer 1 is disposed on the polarization plate 21 such that its absorption axis defines an angle of 20 degrees to 70 degrees relative to the slow phase axis of the polarization plate 21. Accordingly, the lighting light of the display device 20 is converted by the piezoelectric layer 1 from the linear polarization to the elliptic polarization, and then is emitted upward. As a result, even if a person wears polarized sunglasses having the absorption axis whose direction is the same as that of the lighting light, he or she can visually recognize the display member 22 disposed below the piezoelectric sensor 10.

Furthermore, since the retardation value of the piezoelectric layer 1 may be a quarter of the visible light wavelength, the light emitted from the piezoelectric layer 1 is generally converted from the linear polarization to the circular polarization. As a result, even if a person wears polarized sunglasses, he or she can visually recognize the display member 22 disposed below the piezoelectric sensor 10 more clearly.

Furthermore, since the retardation value of the piezoelectric layer 1 may be 800 nm to 30000 nm, the light emitted from the display member is converted to a state close to natural light, and then is emitted from the piezoelectric layer 1. As a result, even if a person observes the display member 22 wearing polarized sunglasses, he or she can observe the display member 22 without seeing a change in color tones.

2. Second Embodiment

The piezoelectric layer 1 may be patterned so as to have active portions and inactive portions.

Figure 2:
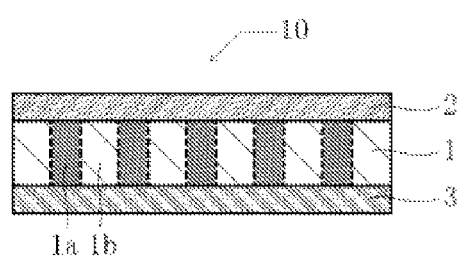
FIG. 2 is a cross section of the piezoelectric sensor.

FIG. 2 is a cross section of the piezoelectric sensor according to the second embodiment.

As shown in FIG. 2, the piezoelectric layer 1 includes active piezoelectric portions 1a and inactive piezoelectric portions 1b.

The active piezoelectric portions 1a are portions where the electrical charge is generated when the load is applied to the piezoelectric sensor 10. In contrast, the inactive piezoelectric portions 1b are portions where the electrical charge is not generated even if the load is applied.

The above-described configuration prevents the generated electrical charge from leaking around the upper electrode 2 or the lower electrode 3 and mixing into other electrodes (i.e., preventing the cross-talk phenomenon). As a result, it is possible to improve position detection accuracy and load detection accuracy.

3. Third Embodiment

Although the configuration in which the piezoelectric layer 1 is interposed between the upper electrode 2 and the lower electrode 3 was described, a reference electrode 4 may be disposed between the upper electrode 2 and the lower electrode 3.

Figure 3:
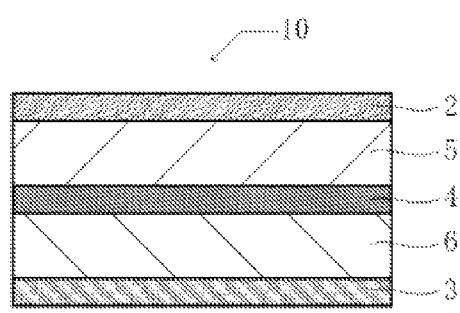
FIG. 3 is a cross section of the piezoelectric sensor.

FIG. 3 is a cross section of the piezoelectric sensor according to the third embodiment.

As shown in FIG. 3, the piezoelectric sensor 10 of the third embodiment includes a reference electrode 4 between the upper electrode 2 and the lower electrode 3. Between the upper electrode 2 and the reference electrode 4, a first piezoelectric layer 5 is provided. Between the lower electrode 3 and the reference electrode 4, a second piezoelectric layer 6 is provided. Materials of the first piezoelectric layer 5 and the second piezoelectric layer 6 are the same as those of the piezoelectric layer 1. Material of the reference electrode 4 is the same as those of the upper electrode 2 and the lower electrode 3.

The above-described structure prevents the generated electrical charge from leaking and mixing into other electrodes at or close to the upper electrode 2 or the lower electrode 3 (i.e., preventing the cross-talk phenomenon). As a result, it is possible to improve the position detection accuracy and the load detection accuracy. Although the upper electrode 2 or the lower electrode 3 is directly laminated on the active piezoelectric portions 1a in the above described case, insulation material such as adhesive and a film may be laminated between the active piezoelectric portions 1a and the upper electrode 2, or between the active piezoelectric portions 1a and the lower electrode 3.

4. Other Embodiments

Figure 4:
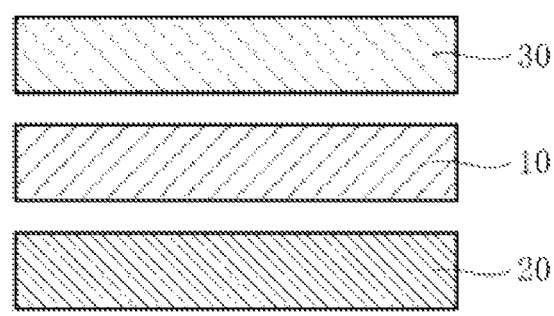
FIG. 4 is a cross section of the electronic device.

As shown in FIG. 4, a touch panel 30 may be laminated on the piezoelectric sensor 10. Since it is configured as mentioned, it is possible to detect the position and amount of the applied load.

Since the touch panel 30 is laminated on the piezoelectric sensor 10, it is possible to detect the position of the applied load. It is particularly preferable to use capacitance type touch panels among touch panels.

The invention claimed is:

1. A pressure detection and display apparatus comprising:
a piezoelectric sensor having an upper electrode, a lower electrode, and a piezoelectric layer interposed between the upper electrode and the lower electrode; and
a display device including a polarization plate located closer to the lower electrode of the piezoelectric sensor and a display member located below the polarization plate;
the piezoelectric layer being made of a retardation plate which converts light from the display member linearly-polarized by the polarization plate to an elliptically or circularly polarized light; and
the piezoelectric sensor and the polarization plate are arranged such that a slow phase axis of the piezoelectric layer defines an angle of 20 degrees to 70 degrees relative to an absorption axis of the polarization plate.

2. The pressure detection and display apparatus according to claim 1, wherein retardation value of the piezoelectric layer is a quarter of visible light wavelength.

3. The pressure detection and display apparatus according to claim 1, wherein retardation value of the piezoelectric layer is 800 nm to 30000 nm.

4. The pressure detection and display apparatus according to claim 1, wherein the upper electrode includes indium tin oxide or "poly(3, 4-ethylenedioxythiophene)".

5. The pressure detection and display apparatus according to claim 1, wherein the lower electrode includes indium tin oxide or "poly(3, 4-ethylenedioxythiophene)".

6. The pressure detection and display apparatus according to claim 1, wherein the piezoelectric layer is made of organic piezoelectric material.

7. The pressure detection and display apparatus according to claim 6, wherein the organic piezoelectric material includes polyvinylidene fluoride or polylactic acid.

8. An electronic device comprising:
a pressure detection and display apparatus according to claim 1; and
a touch panel.

9. The electronic device according to claim 8, wherein the touch panel is a capacitance type touch panel.

10. The pressure detection and display apparatus according to claim 2, wherein the upper electrode includes indium tin oxide or "poly(3, 4-ethylenedioxythiophene)".

11. The pressure detection and display apparatus according to claim 3, wherein the upper electrode includes indium tin oxide or "poly(3, 4-ethylenedioxythiophene)".

12. The pressure detection and display apparatus according to claim 2, wherein the lower electrode includes indium tin oxide or "poly(3, 4-ethylenedioxythiophene)".

13. The pressure detection and display apparatus according to claim 3, wherein the lower electrode includes indium tin oxide or "poly(3, 4-ethylenedioxythiophene)".

14. The pressure detection and display apparatus according to claim 4, wherein the lower electrode includes indium tin oxide or "poly(3, 4-ethylenedioxythiophene)".

* * * * *